Fig. 1

Aug. 1, 1961 W. JONES 2,994,253
HIGH-SPEED CARTON HANDLING APPARATUS
Filed Dec. 16, 1957 8 Sheets-Sheet 2

INVENTOR.
Wickliffe Jones.
BY
Wood, Herron & Evans,
ATTORNEYS.

Aug. 1, 1961 W. JONES 2,994,253
HIGH-SPEED CARTON HANDLING APPARATUS
Filed Dec. 16, 1957 8 Sheets-Sheet 7

INVENTOR.
Wickliffe Jones.
BY
Wood, Herron & Evans.
ATTORNEYS.

Aug. 1, 1961  W. JONES  2,994,253
HIGH-SPEED CARTON HANDLING APPARATUS
Filed Dec. 16, 1957  8 Sheets-Sheet 8

INVENTOR.
Wickliffe Jones
BY
Wood, Herron & Evans
ATTORNEYS.

United States Patent Office 2,994,253
Patented Aug. 1, 1961

2,994,253
HIGH-SPEED CARTON HANDLING APPARATUS
Wickliffe Jones, Cincinnati, Ohio, assignor to The R. A. Jones and Company, Inc., a corporation of Kentucky
Filed Dec. 16, 1957, Ser. No. 702,946
10 Claims. (Cl. 93—53)

This invention relates to a high-speed cartoning machine and is directed in particular to a carton feed mechanism which coacts with the conveyor of the cartoning machine.

One of the primary objectives of the invention has been to provide a carton handling mechanism of simple construction which is capable of erecting collapsed cartons and of transferring them to the cartoning machine continuously and at high speed without any jamming of the parts, thereby to provide a reliable, high speed cartoning operation.

In general, the cartoning machine for which the present mechanism is intended, includes a pair of vertically spaced, parallel conveyor chains, each having outwardly projecting lugs spaced apart from one another and residing in common vertical planes along the chains. At the upstream or infeed end of the conveyor, the chains pass around a pair of companion sprockets; in passing around the sprockets, the lugs assume radial positions and delineate outwardly diverging throats suitable to receive partially erected cartons. The handling mechanism of this invention advances cartons in flat collapsed condition, partially erects them, then transfers them into the converging throats as the lugs pass around the sprockets. At this point, the lugs contact the diagonal corners of the partially erected cartons, which are in parallelogram formation, then the lugs assume positions at right angles to the chains as they advance along a straight downstream run of the conveyor. In their right angular positions, the lugs embrace the opposite sides of the cartons and square them; thereafter, the lugs advance the erected cartons along suitable filling and flap closing devices and finally discharge them as finished articles.

In general, the carton handling apparatus comprises a carton magazine extending outwardly as an endwise extension of the cartoning machine, the magazine being arranged to receive a supply of flat collapsed cartons and to advance them in pack formation lineally to a pick-off station adjacent the infeed end of the cartoning machine. The lugs of the conveyor chain advance the cartons at the rate of approximately 500 cartons per minute; the present feeding mechanism is driven in time with the cartoning machine to advance, erect and transfer the cartons to the open throats in time with the advancement of the lugs. At this rate of speed, the parts obviously move at an extremely rapid rate and it is essential for the cartons to be engaged at the pick-off station and transferred to the lugs at the proper moment, otherwise the mechanism will jam.

One of the significant features of the invention resides in the utilization of an oscillating suction mouthpiece which engages the cartons at the pick-off station and transfers the cartons, by rapid shuttle motion, directly to the open throats delineated by the advancing lugs. The mouthpiece establishes a vacuum engagement with the surface of each carton as it is presented at the pick-off station, then the mouthpiece swings through an arc in a horizontal plane between the spaced sprockets at the infeed end of the cartoning machine, such that the carton is intercepted by the lugs. At the point of interception, the mouthpiece releases its suction engagement and the carton is engaged in the throat. The mouthpiece overtravels this point to an outer limit, then immediately shuttles back to the pick-off station, the transferred carton having been carried beyond the arcuate path of travel of the mouthpiece during the overtravel motion.

The cartons for which the handling apparatus is particularly intended, are fabricated from waxed stock and have a tendency to resist rapid erection. To overcome this difficulty, the feeding apparatus includes an oscillating knife which enters the upper end of the collapsed carton at the pick-off station and preliminarily spreads the side walls just before the suction mouthpiece engages the forward wall for the transfer motion. The oscillating knife moves in synchronism with the suction apparatus, being withdrawn from the carton as the mouthpiece begins to transfer the carton from the pick-off station. In handling cartons fabricated from stock which is not waxed, or which do not present this problem, the oscillating knife may be omitted from the apparatus.

A further objective of the invention has been to provide a self-regulating apparatus which advances the pack of cartons along the magazine in a positive manner toward the pick-off station and which presents the cartons at the pick-off station at a substantially uniform, predetermined feeding pressure for reliable operation of the handling apparatus.

The rearward wall of each collapsed carton, in the direction of advancement, includes flaps which project outwardly from its upper edge, and the pick-off station includes restraining means which engage the upper flaps momentarily, just before the carton is acted upon by the oscillating knife and suction mouthpiece. By virtue of the predetermined feeding pressure acting against the carton pack in the magazine, the body of the carton is bulged forwardly to a slight extent while the upper trailing flaps are held in a rearwardly inclined position by the restraining means; this creates an open entryway adapting the leading end of the knife to pass between the collapsed walls of the carton to effect separation thereof in a positive manner. After the leading wall is engaged by the mouthpiece and the knife has been withdrawn, the flaps are pulled with the carton from the restraining means; at this point, the next carton in the pack advances to the pick-off station for transfer.

In general, the self-regulating apparatus, which creates the constant feeding pressure, comprises a pressure-sensitive switch device contacting the leading carton at the pick-off station. This switch controls a two-speed driving system which advances a follower mechanism along the carton magazine at two different lineal speeds, one speed being slightly slower than the rate of carton transfer, the other being slightly greater than the transfer rate. The follower mechanism engages the trailing end of the pack of cartons; consequently, the leading carton is fed in a positive manner against the restraining means at the pick-off station. During high speed follower motion, the feeding presure gradually builds up to predetermined maximum value, then the pressure sensitive apparatus trips and advances the follower at the slow rate, causing the feeding pressure gradually to diminish to a minimum value, at which point high speed advancement is again initiated. By virtue of the self-regulating feed pressure, the feed rate is held to a mean value which provides reliable pick-off operation while accommodating the variations in compressibility and other factors which normally prevail in the supply of cartons advancing along the magazine.

A further objective has been to permit replenishment of the carton supply in the magazine without interrupting the continuous transfer of cartons at the pick-off station. For this purpose, the magazine includes a belt-type conveyor supporting the carton pack and driven by the two-speed driving system. The follower mechanism includes a follower plate connected to the two-speed driving system by an overrunning clutch which permits the follower plate to be advanced manually in the forward direction relative to the driving system.

As the pack becomes depleted, an additional supply of cartons is placed in the magazine upstream from the follower plate, then the follower plate is lifted manually to a disengaged position and pushed upstream to engage the trailing end of the new supply. Upon disengagement of the follower plate, the feed pressure at the leading end of the pack decreases at the pick-off station; however, the pressure sensitive apparatus responds by commissioning the high speed drive to increase the rate of conveyor advancement. This increase in conveyor speed maintains the feed pressure at the pick-off station within the maximum and minimum values noted above. After the follower plate is shifted upstream, it is lowered to its pack-engaging position, then it is pushed downstream manually (by operation of the overrunning clutch) into engagement with the trailing end of the pack. At this point, normal operation of the apparatus is resumed under control of the pressure-sensitive switch.

In order to align the edges of the collapsed cartons with one another and to facilitate advancement thereof to the pick-off station, the carton magazine includes a vibrator section extending from the end of the magazine conveyor to the pick-off station. The vibrator section is delineated by a bottom and a pair of spaced side walls embracing the pack and imparting vibration to it. The vibratory motion causes the pack to settle into the vibrator section, bringing the cartons into alignment with one another and presenting each carton at the same horizontal plane to the suction apparatus for transfer. The vibratory motion also reduces frictional resistance and thereby facilitates advancement of the cartons to pick-off station.

The principles and advantages of the invention will be more fully apparent to those skilled in the art from the following detailed description taken in conjunction with the drawings.

*General arrangement*

Figure 1:
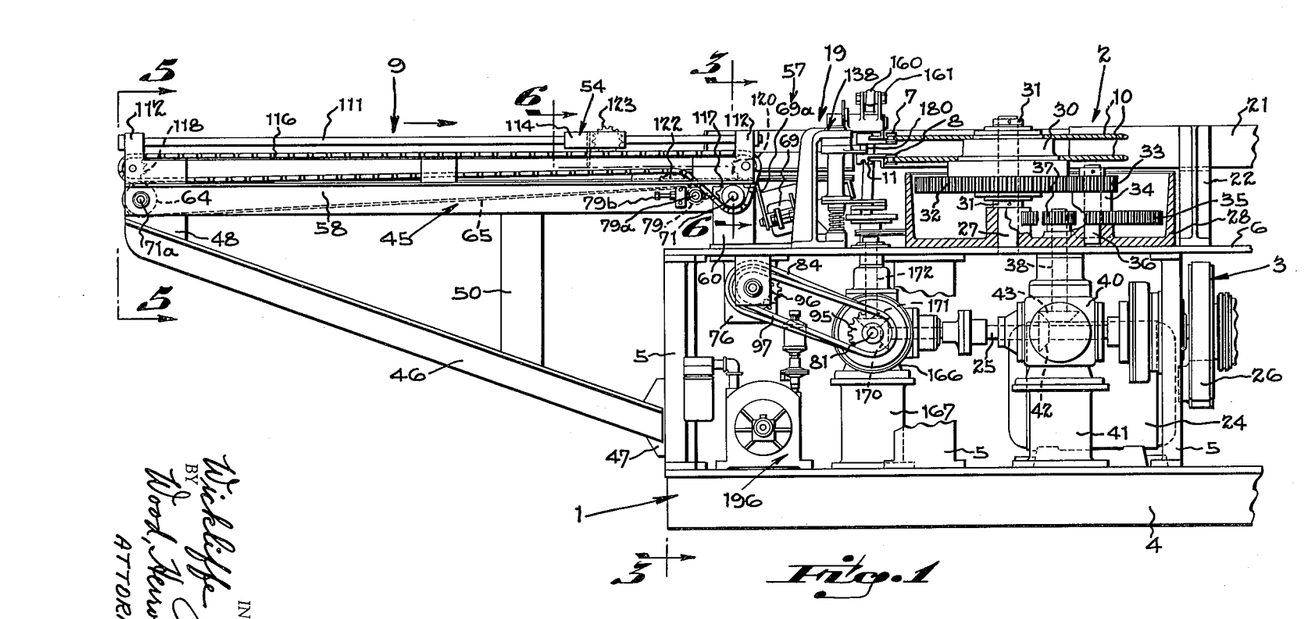
FIGURE 1 is a side elevation showing the infeed portion of a carton machine equipped with the carton feeding and transfer mechanism of this invention.
Figure 2:
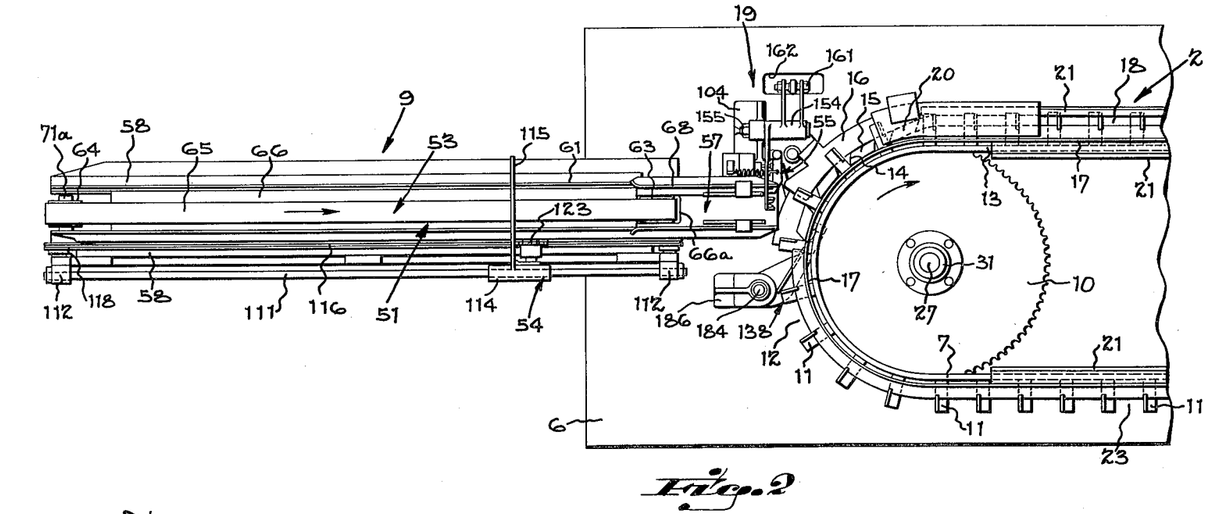
FIGURE 2 is a fragmentary top plan view of the structure as projected from FIGURE 1.

Referring to FIGURES 1 and 2, the carton handling apparatus of the invention is disclosed in relation to a cartoning machine which receives cartons at its intake end, and which subsequently discharges the filled and sealed cartons. Since those components of the cartoning machine, which close and seal the flaps and fill the cartons, form no part of the present invention, they have been omitted from the disclosure. In general, the portion of the cartoning machine which coacts with the carton handling apparatus includes the machine frame indicated generally at 1, the carton conveyor indicated generally at 2 and the driving system indicated generally at 3. The carton feed mechanism of the invention is indicated generally at 9.

As best shown in FIGURE 1, the frame 1 comprises a base structure 4 fabricated from longitudinal and transverse structural members and having a series of upright members 5 supporting the top plate 6. The carton conveyor 2 comprises an upper chain run 7 and a lower chain run 8, the two runs being in the form of endless loops spaced one above the other and extending in parallelism for the full length of the cartoning machine.

The chain runs are driven at uniform lineal speed in the direction indicated by the arrow in FIGURE 2, by a pair of drive sprockets 10—10. The drive sprockets 10 delineate the infeed end of the cartoning machine, the machine being provided with a corresponding pair of idler sprockets at the downstream end of the chain run (not shown). Each conveyor chain 7 and 8 is provided with a series of outwardly projecting conveyor lugs 11, the lugs of the two chains residing one above the other in common vertical planes. As the companion lugs of the chains pass around the sprockets 10 at the infeed end (FIGURE 4), the lugs naturally assume radial positions relative to one another, with their longitudinal axes residing along the lines which pass through the common center of the driving sprockets 10.

Figure 4:
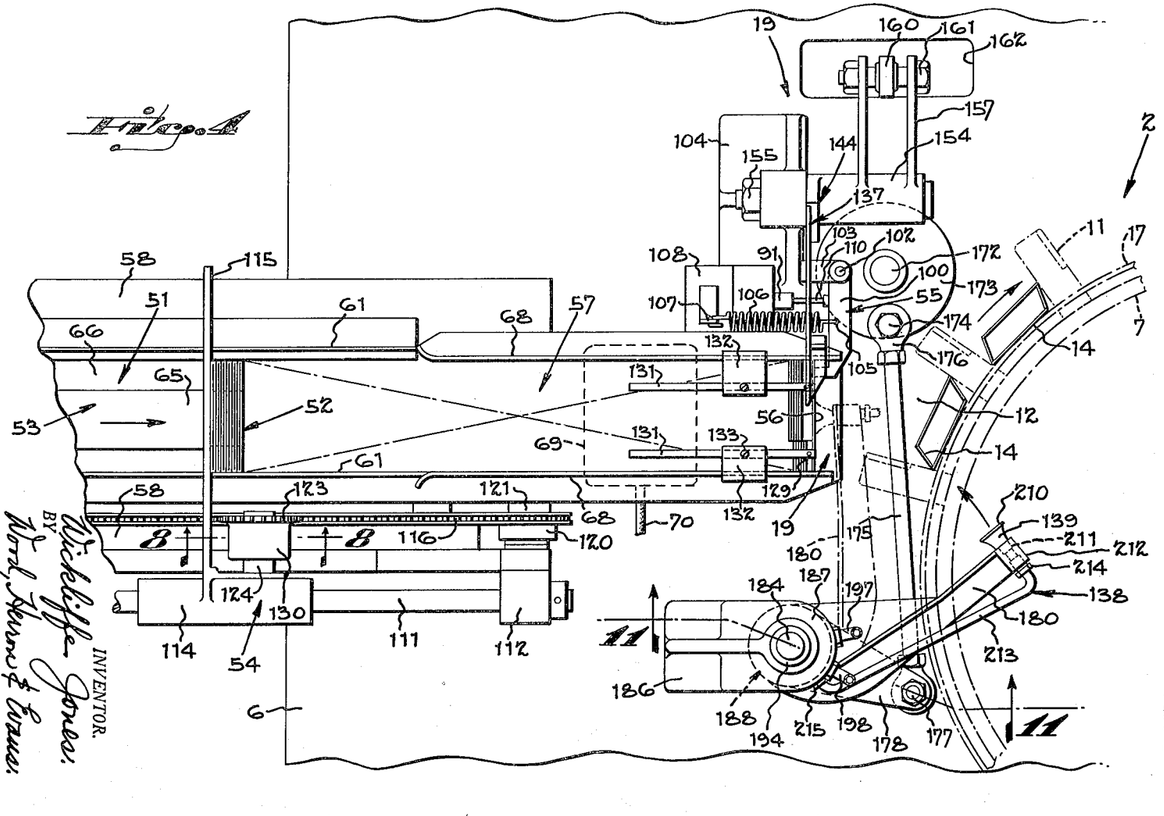
FIGURE 4 is an enlarged fragmentary plan view taken from FIGURE 2, further detailing the mechanism of FIGURE 2.

The carton transfer mechanism operates in synchronism with the advancing lugs so as to withdraw the individual cartons from the pick-off station 19 at the downstream end of handling apparatus 9 (FIGURE 1) and carry them into the radial throats 12, as delineated by the advancing radial lugs. As the chains advance around the sprockets 10 toward the straight downstream run 13 (FIGURE 2), the lugs progressively shift into right angular positions with respect to the chains. Thus, as shown in FIGURE 4, the partially erected cartons 14, as transferred from the pick-off station 19, assume a generally parallelogram formation while travelling around the sprockets in the radial throats 12. The spacing of the lugs is such that they contact the diagonally related corners of the carton as they advance it.

As the cartons are transferred to the conveyor 2, they advance into a stationary arcuate passageway 15 which is delineated by an external guide rail 16 and an internal guide rail 17 (FIGURE 2). The rails 16 and 17 slidably engage the inner and outer walls of the carton as it is advanced toward the longitudinal passageway 18. The longitudinal and arcuate passageways are joined by a connecting passageway 20 which is tangent to the arcuate passageway 15; the cartons are erected by the lugs during advancement across the connecting passageway to the longitudinal downstream passageway 18. It will be noted that the downstream passageway 18 is spaced outwardly from the chain run 13 and that the lugs assume their right angular relationship to the chain as they advance along it. The spacing of the lugs is such that the end walls of the carton are confined between the adjacent lugs, while the side walls of the carton are in sliding engagement with the opposite sides of longitudinal passageway 18. The downstream passageway 18 is delineated by a pair of longitudinal rails 21—21 (FIGURE 2), the guide structure being supported above the top plate 6 by the upright members 22 (FIGURE 1).

The cartons are advanced to the pick-off station 19 in collapsed condition, the cartons being provided with sealing flaps projecting outwardly from their opposite ends. As each carton advances along the downstream passageway 18, with the body of the carton erected, the flaps at the lower end of the carton are folded inwardly and sealed to create a bottom closure; the flaps along the upper end of the carton remaining in collapsed position in which they project upwardly as endwise projections of the carton walls. After the lower flaps are sealed, the cartons advance to a filling mechanism which feeds the contents by gravity into the open end of each carton as it advances. Thereafter, the filled cartons pass through a second flap closing and sealing apparatus which closes and seals the top flaps.

Since the flap closing mechanisms and the carton filling mechanism are not relevant to the invention, they have been omitted from the disclosure. In the cartoning machine disclosed herein, the bottom flap mechanism is located along the downstream passageway 18, the carton filling mechanism is located at or near the downstream end of the machine, and the top flap mechanism is located along the upstream passageway 23. This passageway is similar to the downstream passageway 18 and is delineated by similar longitudinal rails 21—21. After the top flaps have been sealed and folded, the completed packages are discharged from the machine at a suitable point along the upstream passageway 23.

The drive sprockets 10—10 are driven from the driving system 3 by a motor 24 (FIGURE 1) which is mounted upon base structure 4. The motor is in driving connection with a longitudinal shaft 25 by way of a variable speed V-belt drive 26 of conventional design, its details being omitted. It will be understood at this point, that the motor 24 drives the carton handling mechanism 9 and the pick-up mechanism 19 in synchronism with the advancing lugs and other components of the cartoning machine.

As shown in FIGURE 1, the drive sprockets 10—10 are carried one above the other for rotation about a stub shaft 27 having its lower end rigidly mounted in a gear casing 28 carried by top plate 6. Rotatably journalled upon shaft 27 is a stepped hub 30 which carries the drive sprockets 10—10, the sprockets being bolted or otherwise secured to the hub and in driving connection with it. The hub is confined endwisely upon shaft 27 by collars 31—31.

The hub 30 and its sprockets 10 are driven by a large gear 32 attached to the hub and in mesh with a pinion 33. Pinion 33 forms part of a gear couple 34 which includes a large gear 35, the couple being loosely journalled on a second stub shaft 36 which rises upwardly from casing 28. The second large gear 35 is driven by a pinion 37 carried by a vertical drive shaft 38 which is journalled in a gear box 40 mounted on a pedestal 41. The longitudinal drive shaft 25 passes through gear box 40; the gear box encloses a miter gear 42 meshing with a miter gear 43 keyed to the lower end of vertical drive shaft 38. The gear train thus provides a driving connection from longitudinal shaft 25 to the sprockets 10, to rotate the sprockets continuously at a rapid rate in the direction indicated by the arrow in FIGURE 2.

*Carton feed mechanism.*

The carton feed mechanism, previously indicated at 9, extends in cantilever fashion from the infeed end of the cartoning machine, as best shown in FIGURE 1. In general, it comprises a longitudinal conveyor base, indicated generally at 45, supported by braces 46 having their lower ends attached as at 47 to frame 1 of the cartoning machine. The braces are inclined upwardly for attachment as at 48 to the extended end of the base 45. Intermediate supports or struts 50 join the base 45 to braces 46 for additional rigidity.

The base 45 supports an open channel way or carton magazine indicated generally at 51 (FIGURES 4-7) in which is confined a longitudinal pack of cartons in flat collapsed condition, as indicated generally at 52. The lower edges of the flat cartons of the pack rest upon a belt-type magazine conveyor, indicated generally at 53, extending along the bottom of the channel way. The magazine conveyor advances continuously in the direction indicated by the arrows; accordingly, the pack of cartons is advanced continuously toward the pick-off station 19 at the downstream end of the carton magazine.

During normal operation, the pack of cartons 52 in the magazine is advanced in a positive manner toward the pick-off station by a follower mechanism indicated generally at 54. The feeding mechanism advances and transfers the carton at a rate in excess of 500 cartons per minute. In order to provide uninterrupted operation, the pack of cartons must be replenished from time to time as the follower mechanism approaches the pick-off station. For this purpose, the follower mechanism is arranged to be disengaged from the pack and shifted upstream along the magazine to engage the new supply. When the follower is disengaged, the magazine conveyor 53 is speeded up by a pressure sensitive apparatus 55 (FIGURE 4) at the pick-off station; this speed increase builds up the feed pressure at the pick-off station by increasing the frictional action of the conveyor upon the cartons, such that there is no interruption in carton feed. The two-speed operation also creates substantially uniform feeding pressure when the pack is under positive control of the follower mechanism as explained below.

For reliable high speed transfer of the cartons, the leading carton 56 of the pack (FIGURES 4 and 9) is advanced against temporary restraining means at a predetermined minimum pressure to be partially erected as it is withdrawn. As noted above, the carton pack 52 is advanced along the channel way in a positive manner by the follower mechanism 54. However, the number of collapsed cartons in a given length of the pack will vary because of natural differences in the flatness and compressibility of the individual cartons. Moreover, due to stacking and handling, some portions of the pack may be misaligned relative to other portions and create frictional resistance in the channel way. These factors normally would cause fluctuations in the feeding pressure at the pick-off station and would tend to cause jamming of the high speed pick-off mechanism.

In order to advance the pack in time with the pick-off mechanism and maintain substantially constant feeding pressure against the leading carton 56, at the pick-off station, the pressure sensitive control mechanism 55 provides two-speed rate for the magazine conveyor 53 and follower 54 in response to pressure variations between maximum and minimum values at the pick-off station. The two-speed drive is provided by a sprocket system in driving connection with the common driving system 3, operating under the control of an electric clutch as described later. During high speed drive, the follower mechanism advances at a rate somewhat greater than is necessary to advance the cartons in time with the pick-off mechanism; the low speed rate is somewhat lower than the pick-off speed. By operation of the pressure sensitive apparatus 55, the rate of advancement of the conveyor and follower varies from time to time between the high and low speeds to create a mean feed rate which is equal to the pick-off speed. For example, when the apparatus is feeding at the slow rate, the feeding pressure at the pick-off station gradually diminishes to the predetermined low limit, at which point the pressure responsive apparatus 55 trips to the high speed drive. At this point, feeding pressure gradually builds up until the predetermined maximum pressure is reached, at which time, the apparatus trips back to the low rate. Accordingly, the self-regulating feed rate compensates automatically for variations in the pack and maintains substantially constant feeding pressure for reliable operation of the pick-off mechanism.

In addition to this function, the pressure sensitive apparatus provides continuous feeding of cartons when the pack of cartons in the channel way is replenished from time to time. It will be understood that the carton pack is depleted rather frequently because of the high speed operation of the machine. As the length of the carton pack decreases, additional cartons are placed in the channel way upstream from the follower mechanism, then the follower mechanism is disengaged, shifted upstream and placed in position against the trailing end of the new supply.

It will be observed that normally the feed pressure at the pick-off station would be greatly diminished upon disengagement of the follower mechanism. However, the pressure sensitive apparatus 55 immediately shifts the conveyor drive to high speed so as to accelerate the magazine conveyor 53. This speed-up raises the feeding pressure at the pick-off station to a point within the maximum and minimum limits, so that there is no interruption in the transfer of cartons during reloading. When the follower mechanism engages the new pack in the channel way, the pressure responsive apparatus resumes its normal operation, as outlined above.

In order to insure that the cartons are uniformly aligned with one another at the pick-off station 19, the downstream end of magazine 53 communicates with a vibrator section 57 (FIGURE 2) which leads to the pick-off mechanism. The vibrator section provides continuity in the forward motion of the cartons after they leave the magazine conveyor; moreover, by its vibratory action, the edges of the cartons are brought into precise alignment with one another, such that each travels through the same plane during transfer by the pick-off mechanism.

Figure 3:
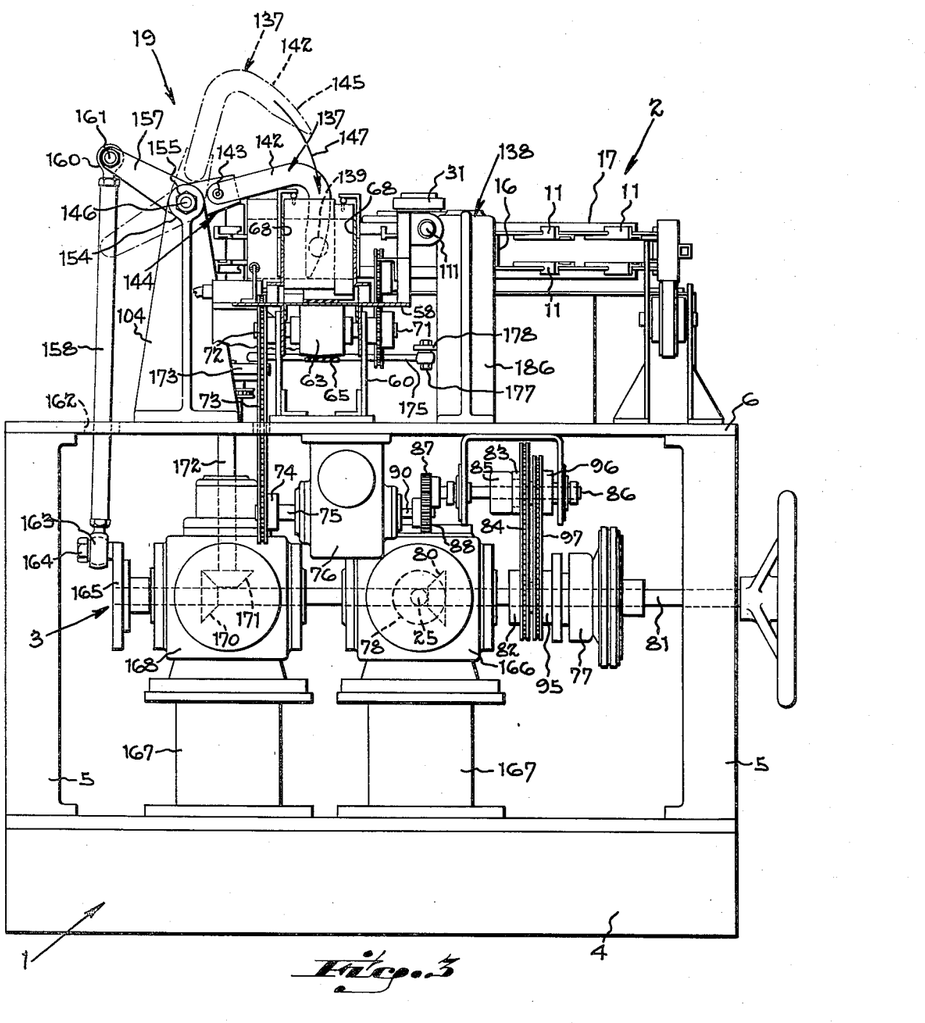
FIGURE 3 is an enlarged cross sectional view of the carton feeding and transfer apparatus taken along line 3—3 of FIGURE 1.

Described in detail (FIGURE 5) the conveyor base 45 comprises a pair of spaced parallel angle irons 58—58 which are attached as at 48 to the braces 46 (FIGURE 1) previously noted. The downstream ends of the angle irons 58 are supported upon respective brackets 60—60 which rise upwardly from top plate 6 (FIGURES 1 and 3). The channel way 51 is delineated by a pair of spaced rails 61—61, the right hand rail being carried in an elevated plane by a longitudinal bar 62, both rails being supported by the angle irons 58.

Figure 16:
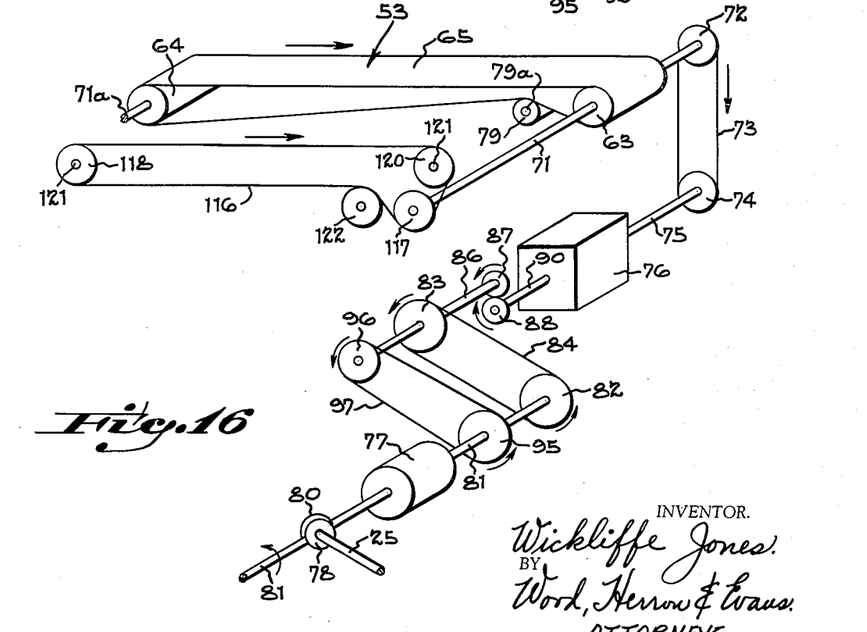
FIGURE 16 is a diagrammatic view further illustrating the two-speed driving system.

The magazine conveyor 53 consists of a drive conveyor roller 63 at the downstream end of the conveyor and an idler roller 64 at the upstream end (FIGURES 1 and 16). A conveyor belt 65, fabricated from pliable material, such as rubber or the like, is tracked upon the rollers 63 and 64, the upper run of the belt being slidably supported by a base plate 66. This plate has its opposite side edges secured to the angle irons 58 as at 67.

As best shown in FIGURES 3 and 4, the vibrator section 57 is delineated by a pair of side plates 68—68 which rise above the magazine rails 61 to confine the cartons substantially for their full height. The bottom plate 66 extends forwardly from the magazine and forms the bottom of the vibrator section 57. As best shown in FIGURE 2, the bottom plate 66 includes an opening 66a for passage of the conveyor belt 65, such that the cartons are transferred at this point from the end of the conveyor belt to the plate.

Vibratory motion is imparted to the vibrator section by a conventional electrical vibrator unit 69 (FIGURES 1 and 4). The vibrator is connected to the base plate as at 69a and is energized by a cable indicated at 70. It will be understood that it is energized continuously while the machine is in operation so as to impart vibratory motion to the bottom plate 66 and side plates 68, causing the packed cartons to settle down into precise alignment. The vibratory motion aids in advancing the cartons through this section by reducing substantially the effect of frictional drag.

Figure 6:
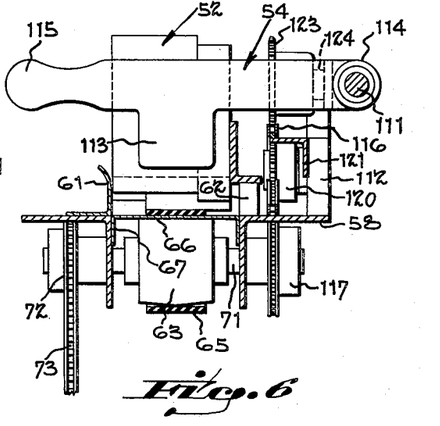
FIGURE 6 is an enlarged sectional view taken along line 6—6 of FIGURE 1, further detailing the feed mechanism, particularly the follow plate structure which advances the cartons toward the erecting mechanism.

The drive roller 63 of the magazine conveyor is keyed upon a drive shaft 71 which is journalled in the spaced brackets 60—60 above base plate (FIGURE 1). As shown in FIGURES 3, 6 and 16, a sprocket 72 is keyed upon drive shaft 71, the sprockets 72 being driven through a chain 73 from a sprocket 74. Sprocket 74 is mounted upon the output shaft 75 of a speed reducer 76. The speed reducer is driven by the two-speed driving system under control of the pressure responsive apparatus 55.

Figure 5:
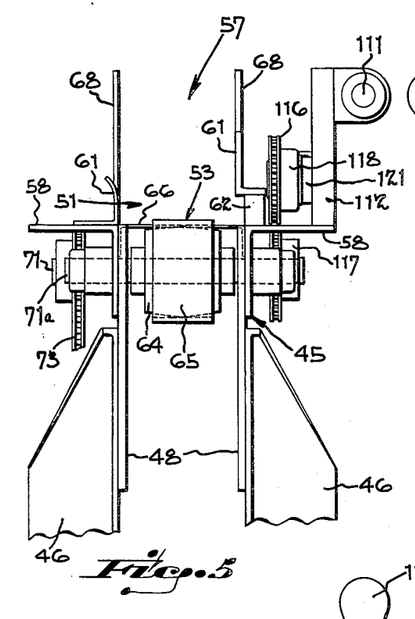
FIGURE 5 is a fragmentary end view of the carton magazine as viewed along line 5—5 of FIGURE 1.

The conveyor idler 64 is mounted upon an idler shaft 71a, similar to drive shaft 71 (FIGURE 5). This shaft is journalled between the angle irons 58—58. As indicated in FIGURE 16, the tension of the conveyor belt 65 is regulated by a slack control roller 79 journalled on a shaft 79a. Adjustment is obtained by adjustment screws 79b at opposite sides of the conveyor (FIGURE 1). These screws engage the endwise portions of shaft 79a and may be rotated in the usual way to regulate belt tension.

*Two-speed driving apparatus*

Figure 15:
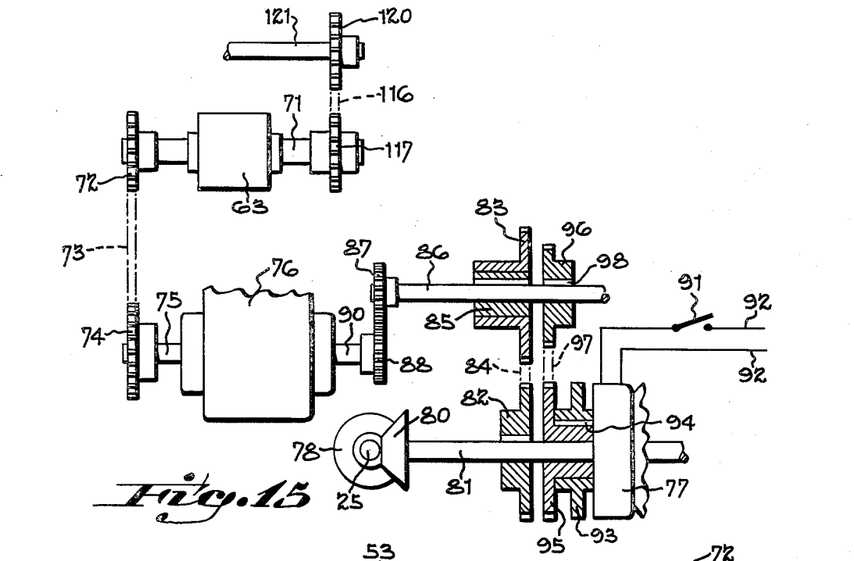
FIGURE 15 is a diagrammatic view illustrating the electrical clutch and driving system which provides the two-speed advancement of the conveyor and follower mechanism in response to variations in carton feed pressure.

Referring to FIGURES 15 and 16, which illustrates the two-speed driving system in diagrammatic form, it will be noted that the speed reducer 76 is driven from the common drive shaft 25 through an electrically operated magnetic clutch 77 of conventional design. During low speed operation, the conveyor drive is by way of the miter gear 78 of longitudinal shaft 25 to a miter gear 80 keyed to a cross shaft 81. A sprocket 82 keyed to shaft 81 drives a companion sprocket 83 by way of sprocket chain 84. Sprocket 83 includes an overrunning clutch indicated at 85. This clutch establishes a driving connection with a cross shaft 86 to drive the shaft in the direction indicated by the arrow in FIGURE 16. It will be understood that the overrunning clutch allows the shaft 86 to rotate in the same direction at a speed greater than sprocket 83, when the magnetic clutch 77 is energized for the high speed drive, as explained below. Shaft 86 includes a gear 87 meshing with a gear 88 which is fixed on the input shaft 90 of speed reducer 76.

Under low speed drive, with magnetic clutch 77 de-energized, the magazine conveyor 53 is driven continuously from shaft 81 through low speed sprockets 82 and 83 and by way of gears 87 and 88 to the speed reducer 76. From the speed reducer, the drive is completed by way of sprocket 74, chain 73 and sprocket 72 to the conveyor drive roller 63, as indicated by the arrows in FIGURE 16.

The pressure sensitive control apparatus 55 includes a switch 91 (FIGURE 15) which is tripped to an open position when the pressure imposed upon the leading carton 56 is at maximum value, or at least above minimum value. When the follower is disengaged, or when the pressure diminishes to the minimum value, then switch 91 is tripped to closed position, energizing clutch 77 for high speed drive. As shown in FIGURE 15, the switch 91 is interposed in one of the power lines 92—92 which energizes magnetic clutch 77.

As indicated diagrammatically (FIGURE 15), the magnetic clutch includes a shiftable coupling element 93, slidably keyed as at 94 to the hub of a high speed sprocket 95. The high speed sprocket 95 is loosely journalled upon shaft 81, the shaft being normally free to rotate relative to the sprocket. When the magnetic clutch is energized, it creates a driving connection from shaft 81 through clutch element 93, to high speed sprocket 95. The high speed sprocket 95 is in driving connection with a companion high speed sprocket 96 through a sprocket chain 97. Sprocket 96 is keyed as at 98 to shaft 86. Since high speed sprocket 96 has a smaller pitch diameter than low speed sprocket 83, shaft 86 is driven at a higher rate, by operation of overrunning clutch 85. The conveyor belt and follower are thus driven at an accelerated rate so long as switch 91 is held in its closed position. During high speed operation, the low speed sprockets continue rotation but have no effect upon the driving system. As soon as maximum feed pressure is again obtained, switch 91 is tripped to its open position and magnetic clutch 77 disengages; therefore, the low speed sprockets 82 and 83 immediately take over the drive.

Figures 9, 10:
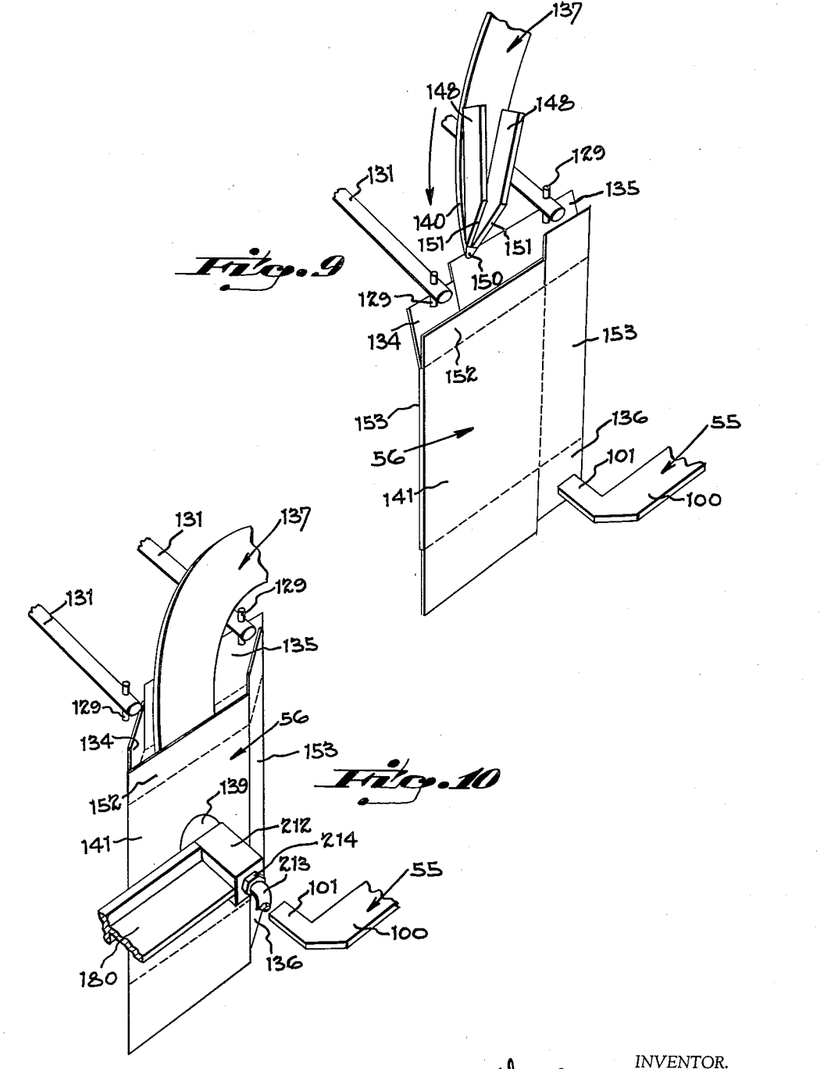
FIGURE 9 is a perspective view showing the leading carton at the pick-off end of the feed mechanism in position to be transferred to the conveyor of the cartoning machine.
FIGURE 10 is a view similar to FIGURE 9, showing the action of the carton erecting mechanism partially erecting the carton for transfer to the cartoning machine.

The pressure responsive apparatus 55 is best illustrated in FIGURES 4, 9 and 10 and includes a feeler or pressure finger 100 having an endwise extension 101 which is engaged by the lower portion of the leading carton 56. The finger is pivotally mounted as at 102 (FIGURE 4) to a bracket 103 carried by a casting 104 which forms a part of the pick-off mechanism. Intermediate the lengh of feeler 100, there is anchored as at 105, a tension spring 106, the opposite end of the spring being anchored as at 107 to a switch mounting block 108. This block is supported at the required elevation by an appropriate extension (not shown) of the casting 104. The tension spring 106 biases the finger under predetermined pressure against the leading end of the advancing carton pack, causing the finger to react in response to the minimum and maximum feed pressures as explained above.

The switch 91, previously noted in FIGURE 15, is mounted upon block 108 and includes a stem 110 in abutment with the finger 100. The switch preferably comprises a sensitive commercial microswitch, its contacts being normally open and being closed by depressing the stem 110. Thus, when the feed pressure diminishes during low speed advancement of the conveyor and follower, spring 106 pulls finger 100 in switch-closing direction to depress stem 110, thereby to close the switch contacts for high speed operation. As feed pressure increases during high speed operation, the finger gradually overcomes the tension of spring 106, allowing the switch contacts to open for low speed operation with the electric clutch deenergized.

*Follower mechanism*

The follower mechanism 54 is slidably mounted upon a slide rod 111 (FIGURES 1 and 4) which extends for the full length of the carton magazine, its opposite ends being supported by mounting blocks 112—112 rising from the angle irons 58 along one side of the magazine. As best shown in FIGURE 6, the trailing end of the carton pack is engaged by a follow plate 113 projecting laterally from a sleeve 114 slidably mounted on rod 111. The opposite or free end of the follow plate includes a handle 115 by means of which the follow plate may be swung to a disengaged position with respect to the cartons, as shown in FIGURE 7, sleeve 114 being free to rotate on rod 111 for this purpose.

The follow plate is advanced lineally by a follower sprocket chain 116 passing around a drive sprocket 117 and an idler sprocket 118 (FIGURES 1, 15 and 16). The drive sprocket 117 is keyed to the shaft 71 which drives conveyor roller 63, as shown in FIGURE 16. In order to locate the upper run of the follower chain in spaced parallel relationship with slide rod 111, the chain passes from the drive sprocket upwardly about a second idler sprocket 120 at the downstream end, which is located above drive sprocket 117. The idler sprockets 118 and 120 are mounted upon shafts 121—121 journalled in the support blocks 112 of the slide rod 111. Tension is imparted to the follower chain 116 by a slack control sprocket 122 (FIGURE 16) suitably journalled beneath the chain.

The upper run of the follower chain advances in the same direction and at the same lineal rate as the conveyor belt 65, as indicated by the arrows in FIGURE 16. A driving connection is provided between the follower chain and follower plate by sprocket 123 which is mounted upon a shaft 124 projecting radially from the follower sleeve 114. When the follower plate is engaged as in FIGURE 6, the teeth of sprocket 123 interfit the links of chain 116; when the follower plate is shifted to its disengaged position (FIGURE 7), the sprocket is disengaged from the chain, permitting the follower assembly to be shifted upstream along the magazine. As noted earlier, the fresh supply of cartons preferably is placed in the magazine behind the follower plate, then the follower is shifted upstream along rod 111 to engage the trailing end of the new pack. The follower plate thereafter is shifted by hand into engagement with the pack (FIGURE 4) thus reengaging sprocket 123 with chain 116.

Figures 7, 8:
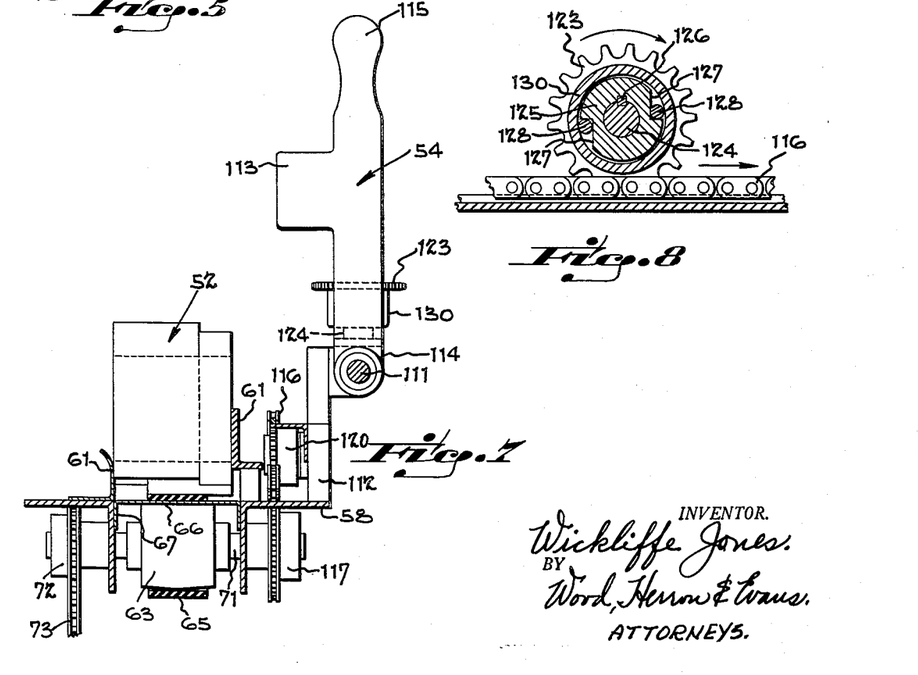
FIGURE 7 is a view similar to FIGURE 6, showing the follow plate in a disengaged position for reloading the carton magazine.
FIGURE 8 is an enlarged fragmentary sectional view taken along line 8—8 of FIGURE 4, detailing the overrunning clutch of the carton follower mechanism.

In order to permit the follower plate to be advanced downstream to the fresh supply of cartons, an overrunning or one way clutch is interposed between sprocket 123 and its non-rotatable shaft 124 as shown in FIGURE 8. The design of the clutch is optional, the type disclosed having a wedging collar 125 keyed as at 126 to shaft 124 and providing opposed wedging faces 127—127 extending generally at a tangent to shaft 124. Respective clutch rollers 128—128 act against the wedging faces and are confined by the cylindrical hub 130 which forms a part of the follower sprocket 123.

As the follower plate is pushed manually downstream toward the end of the carton supply, with the sprocket engaged in the chain, the overrunning clutch allows the sprocket and its hub to rotate relative to the wedging collar 125 in the direction indicated by the arrow in FIGURE 8. Upon reaching the end of the carton pack, the follower chain 116, which is moving in the direction indicated by the arrow, tends to rotate the sprockets; at this point, the rollers 128 are carried by the hub 130 outwardly along the wedging faces 127, thus locking the hub and sprocket to the wedging collar 125. This establishes a positive driving connection between the sprocket and follower chain, causing the follower plate to move lineally with the chain.

*Carton pick-off mechanism*

Upon reaching the discharge end of the vibrator section 57, the upper edge of each carton is engaged by a pair of retaining pins 129—129 which project downwardly from a pair of horizontal mounting rods 131—131 (FIGURES 4 and 9). The mounting rods 131 are carried by respective mounting brackets 132 attached to the upper edges of the side walls 68 of the vibrator section. The rods may be secured in the brackets by means of screws 133 for adjustment of the rods lengthwise.

As best shown in FIGURE 9, one of the retaining pins 129 engages the side wall flap 134 of the carton and the other pin engages one of the end wall flaps 135. It will be noted that the flaps 134 and 135 project upwardly from the trailing side of the carton, in the direction of carton feed, such that the two flaps are sprung to a rearwardly inclined position, with the carton body forced outwardly to a slight extent under the feeding pressure which acts upon the pack. It will also be noted that the contacting end 101 of the pressure finger 100 is in contact with the lower side wall flap 136, the carton being supported upon the bottom plate 66 of the vibrator section 57. In the position shown in FIGURE 9, the carton is about to be transferred by the pick-off mechanism 19 to the lugs 11 of the carton conveyor 2 (FIGURE 4).

The pick-off mechanism 19 comprises an oscillating finger or knife indicated generally at 137 and an oscillating suction apparatus, indicated generally at 138 in FIGURES 9 and 10. The knife and suction apparatus oscillate in time with one another; thus, as shown in FIGURE 9, the leading end 140 of knife 137 enters the upper end of the carton while it is momentarily restrained by the pins 129 and finger 101 to partially erect the carton, then the mouthpiece or suction cup 139 of the suction apparatus engages the side wall 141 of the carton for the erection and transfer. The timing is such that the knife 137 reaches the lower limit of its stroke at about the same time the suction mouthpiece comes into contact with side wall 141. At this point, the knife retracts from the partially erected carton and the suction mouthpiece withdraws the carton from the retaining pins 129 and finger 101. As explained later in detail, vacuum and air pressure alternately is applied to the mouthpiece in time with its oscillations.

As noted earlier, the pick-off mechanism is in driving connection with the driving system 3, such that the suction apparatus carries the carton directly into the open throat 12 in time with the advancement of the lugs 11. Referring to FIGURE 4, the suction apparatus is shown in broken lines in its pick-off position, corresponding to FIGURE 10. As the pick-off apparatus swings outwardly to the position shown in full lines, the carton, which it carries, is intercepted by the advancing throat 12; at this point, the suction apparatus releases the carton and continues its swinging motion to its outer limit. During the outward swing, the lugs 11 continue advancing the carton, such that the carton is clear of the path of motion during the next pick-up stroke of the suction apparatus. The pick-off apparatus partially erects and transfers the cartons continuously at a rate of approximately 500 per minute, the erection being completed as the lugs advance to the downstream passageway 18 of the cartoning machine.

Described in detail with reference to FIGURE 3, the oscillating finger 137 is generally hook-shaped, comprising a mounting shank 142 attached as at 143 to a rocker arm 144. The swinging portion of the finger, as indicated at 145, is curved along a line which is concentric to the axis of the pivot bolt, as indicated at 146. The leading end 140, as viewed in FIGURE 3, swings along the arc as indicated by the arrow 147 from the retracted position shown in broken lines to the active position shown in full lines.

In order to provide a carton spreading action, the leading end 140 is provided with a pair of flukes or spreaders 148 which diverge outwardly from the point 150 (FIGURE 9). The outer edges of the flukes are inclined outwardly as at 151 from the point 150 along the leading end. As viewed in FIGURE 9, the leading end of the knife passes between the spaced mounting rods 131—131, as the flaps 134 and 135 are held to their rearwardly inclined positions by the pins 129 to delineate an entryway.

As the point 150 enters the body of the collapsed carton, the inclined leading edges 151 cam against the forward top flap 152; then as downward motion continues, the inclined edges progressively swing the forward carton wall outwardly about the end walls 153—153 in parallelogram fashion (FIGURE 10). During this swinging motion, the flap 134 is disengaged from its retaining pin 129, and the lower end wall flap 136 slips from beneath the feeler 101. At the limit of downward motion of the knife, the mouthpiece 139 will have shifted into vacuum engagement with the forward wall 141 which is now supported by the flukes 148. As the knife is withdrawn and the suction apparatus begins its transfer motion, the upper side wallflap 134 is pulled from its retaining pin 129. As soon as the carton is picked off, the next carton of the pack advances to the retaining pins 129 and finger 101 to be picked off upon the next cycle.

The rocker arm 144 (FIGURE 4) includes a hub 154 journalled on the pivot bolt 146, which is secured by a nut 155 to the upper end of the casting 104, rising from top plate 6. The rocker arm includes a pair of parallel actuating levers 157 projecting outwardly from hub 154, the swinging ends of parallel levers being pivotally connected to an actuating link 158 (FIGURE 3). The upper end of the link includes a universal joint 160 traversed by a clevis bolt 161 passing through the levers 157. The universal joint accommodates the arcuate motion of the swinging end of the levers 157 about pivot bolt 146. The link passes through an opening 162 formed in top plate 6 and its lower end includes a second universal joint 163. The lower universal joint is connected by a crank pin 164 to a crank disk 165 which is attached to the cross shaft 81 previously noted with respect to the two-speed driving system (FIGURE 16). As described earlier, cross shaft 81 is driven by way of the miter gears 78 and 80 from the longitudinal shaft 25. The crank and link connection thus oscillates the knife 137 in time with the carton feed mechanism and other components of the machine.

As best shown in FIGURE 3, the miter gears 78 and 80 are enclosed within a gear box 166 supported upon a pedestal 167 carried on base 4. From gear box 166, the cross shaft 81 passes through an adjacent gear box 168, mounted on a similar pedestal 167. Keyed upon shaft 81 within gear box 168 is a miter gear 170 meshing with a miter gear 171 which is keyed to a vertical drive shaft 172. Drive shaft 172 actuates the suction apparatus in time with the oscillating knife, as described below.

Referring to FIGURE 4, the vertical drive shaft 172 passes through top plate 6 and upon its upper end there is keyed a crank disk 173 having a crank pin 174. The suction apparatus is actuated by a link 175 pivoted as at 176 to crank pin 174. The opposite end of link 175 is pivoted in a similar manner to a pivot bolt 177 carried at the outer end of a lever 178; lever 178 actuates an oscillating arm 180 which carries the suction mouthpiece 139.

As indicated in FIGURES 1 and 4, the swinging portion of the oscillating arm 180 resides between the spaced sprockets 10—10 of the carton conveyor. The diameter of the suction cup 139 is less than the spacing between the upper and lower lugs (FIGURE 3), such that the cup is free to pass without interference as it oscillates between the two positions shown in FIGURE 4. The carton is supported at the pick-off station at an elevation at which the suction cup contacts the carton at a mid-point along its length, as indicated in broken lines in FIGURE 3. The mouthpiece swings in a horizontal plane as it picks off the carton, the timing being such that the carton reaches the radial throat 12 without contacting the advancing lugs 11 until it enters the confines of the throat.

The suction engagement of the mouthpiece, as explained below, prevails until the wall of the carton contacts the internal guide 17 of the carton conveyor; at this point, air pressure is applied, causing the carton to be released. The diagonal corners of the carton are now in contact with the opposed lugs 11 and the carton is engaged by the external guide 16 (FIGURE 2) in the same plane at which it was picked off.

Figures 11, 12:
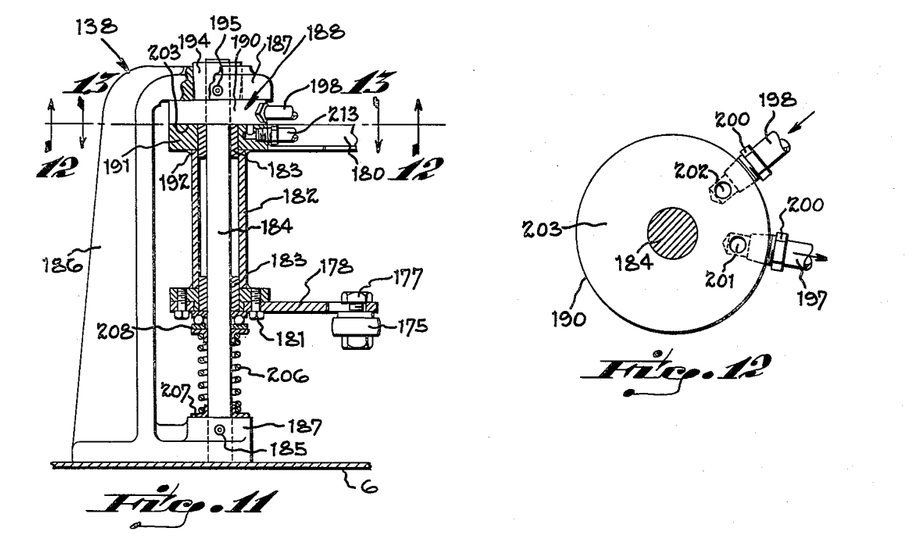
FIGURE 11 is a sectional view taken along line 11—11 of FIGURE 4, detailing the suction mechanism which withdraws the carton from the pick-off station and transfers it to the cartoning machine.
FIGURE 12 is an enlarged sectional view taken along line 12—12 of FIGURE 11, detailing the stationary valve port disk of the suction apparatus.

As seen in FIGURE 11, the lever 178 is bolted as at 181 to the lower end of sleeve 182. The sleeve in turn is journalled as at 183—183 upon a vertical shaft 184 which has its opposite ends supported by a bracket 186 rising from top plate 6. As viewed in FIGURE 11, bracket 186 is generally U-shaped providing opposed bosses 187—187. Shaft 184 is locked by a set screw 185 passing through the lower boss.

Immediately below the upper boss 187, there is mounted a rotary slide valve indicated generally at 188 which controls the admission of vacuum and air pressure alternately to the mouthpiece 139. In general, the valve 188 consists of a stationary disk 190 and an oscillating disk 191. The oscillating disk 191 is attached as at 192 directly to the upper end of sleeve 182 and oscillates in unison with lever 178 and sleeve 182 relative to the stationary disk 190. The oscillating arm 180 (of suction cup 139) is attached as at 193 directly to the periphery of the oscillating valve disk 191 (FIGURE 13), the arrangement being such that pressure and suction are applied to the mouthpiece 139 through valve 188 in time with the oscillating movements of the arm 180. For timing purposes, the stationary disk 190 includes a mounting hub 194 fitted into the upper boss 187 and locked in radial adjustment by a set screw 195 (FIGURE 11).

As shown in FIGURE 1, the cartoning machine is equipped with a motor-driven vacuum pump 196 mounted upon the base structure 4. The vacuum pump is of conventional design and includes an air intake or vacuum passageway and an outlet or pressure passageway (not shown). As shown in FIGURE 12, a flexible vacuum conduit 197 and a pressure conduit 198 extend from pump 196. These conduits include fittings 200—200 threaded into the stationary disk 190; vacuum conduit 197 leads to a vacuum port 201 and pressure conduit 198 leads to a pressure port 202. The lower face of stationary disk 190, to which the ports open, is machined to a smooth finish. The upper face of oscillating disk 191 is similarly machined, the two faces being in sliding engagement and providing an air seal in the presence of a suitable lubricant (FIGURE 11).

The two faces are held in bearing engagement by a compression spring 206 seated as at 207 upon the lower boss 187 (FIGURE 11). To reduce friction, a ball bearing 208 is interposed between the upper end of the spring and the lower end of sleeve 182, compressive force of the spring being transmitted through the ball bearing to sleeve 182 and valve disk 191.

The operation of the oscillating valve is best described with reference to FIGURES 4, 13 and 14. The mouthpiece 139 is in the form of a rubber suction cup which is bell-shaped as viewed in FIGURE 4, its outer end 210 being open. The inner portion 211 of the mouthpiece is secured in one end of a collar 212 mounted on the swinging end of the oscillating arm 180. A flexible conduit 213 has a fitting 214 threaded into the opposite end of the collar 212, the fitting being in communication with the mouthpiece 139. The conduit 213 at its opposite end has a fitting 215 threaded into the periphery of the oscillating disk 191 and in communication by way of port 216 with an arcuate valve slot 217 (FIGURES 13 and 14).

Figure 13:
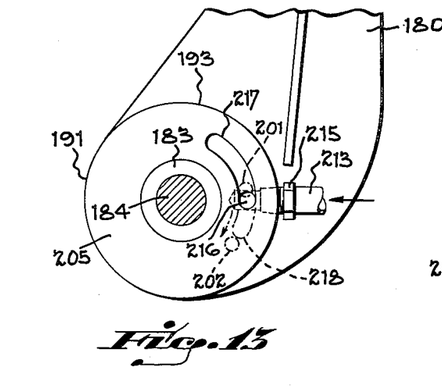
FIGURE 13 is a sectional view taken along line 13—13 of FIGURE 11, detailing the oscillating valve disk in carton pick-up position. At this point, the position of the suction cup corresponds to that shown in broken lines in FIGURE 4, with suction applied to the cup for withdrawing the carton.
Figure 14:
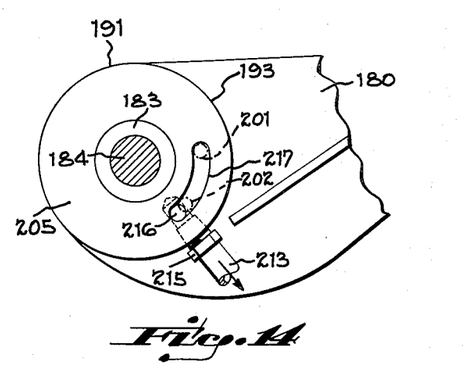
FIGURE 14 is a view similar to FIGURE 13, showing the parts shifted to the retracted position corresponding to that shown in full lines in FIGURE 4, wherein the valve ports relieve the vacuum for releasing the carton as it is transferred to the cartoning machine.

The length of the arcuate valve slot is somewhat greater than the spacing of the vacuum and pressure ports 201 and 202, as indicated in broken lines in FIGURES 13 and 14. When the oscillating arm 180 is in its pick up position (shown in broken lines in FIGURE 4), the valve slot 217 is in communication with the vacuum port 201, such that vacuum is applied to mouthpiece 139 by way of conduit 213 (FIGURE 13). This condition prevails as the arm swings back from its pick-up position; as the carton is transferred to the throat 12, the leading end 218 of the arcuate slot will have advanced to the air pressure port 202 as indicated in broken lines in FIGURE 13. At this point in the cycle, air pressure is applied by way of port 202 and slot 217 to the mouthpiece, causing it to release its vacuum grip as the carton is intercepted by the arcuate guide 17 (FIGURE 4) of the carton conveyor. Thereafter, the arm swings to its fully retracted position (FIGURE 14) then swings back toward its pick-up position. During the return motion, the oscillating disk 190 closes off the pressure port 202 and reestablishes communication with the vacuum port 201, such that air is pulled through the mouthpiece before it reaches the next carton to be picked off.

From the foregoing, it will be understood that in feeding cartons which do not require positive separation from collapsed condition, the oscillating finger knife 137 may be omitted. It has been found that cartons which are fabricated from light weight stock or those which are not waxed, will be partially erected by operation of the suction mouthpiece alone. In this case, the feeding pressure supplied by the follower mechanism presents the leading carton with sufficient backing for suction engagement by the mouthpiece. Upon engaging the carton wall, the mouthpiece partially erects the carton while its flaps are engaged by the retaining pins; thereafter, the mouthpiece pulls the flaps from the pins and transfers the carton to the lugs in the manner described above.

Having described my invention, I claim:

1. An apparatus for transferring cartons to a cartoning machine comprising, an elongated carton magazine having a conveyor belt arranged to support a pack of cartons and frictionally advance the same, follower means engageable with an upstream end of said pack of cartons, electrically controlled two-speed driving means connected to said conveyor belt and follower means for advancing the follower means and pack continuously in a downstream direction along said magazine, a shiftable pressure-responsive device mounted to contact the leading end of said pack of cartons, said pressure-responsive device including a shiftable switch interconnected with the electrically controlled two-speed driving means and controlling the speed thereof, said pressure-responsive device shifting said switch in response to the feeding pressure at the leading end of said pack of cartons, the driving means advancing the follower means at two different rates which provide a substantially uniform feeding pressure at the leading end of said pack of cartons in response to the shifting of the switch by the pressure-responsive device, and transfer means at the downstream end of the magazine engageable successively with the cartons advanced to the leading end of the pack, said means transferring said cartons individually to the cartoning machine, said follower means adapted to be disconnected from the two-speed driving means for replenishing the supply of cartons in the magazine, said conveyor belt adapted to maintain the carton feeding pressure at the leading end of the pack with the follower disengaged.

2. An apparatus for transferring cartons to a cartoning machine comprising, an elongated carton magazine arranged to support a pack of cartons in flat collapsed condition, said carton magazine having a carton pick-off station at a downstream portion thereof, a follower engageable with the trailing end of said pack of cartons, a two-speed driving system connected to said follower for advancing the follower and pack of cartons continuously toward said pick-off station, said follower creating a positive feeding pressure upon the leading end of said pack at the pick-off station, a shiftable two-position pressure-responsive device mounted to contact the leading end of the pack at the pick-off station, said pressure-responsive device interconnected with the two-speed driving system, said pressure-responsive device including means yieldably urging the same into engagement with the leading end of the pack at said pick-off station, said pressure-responsive device shifting in an upstream direction to a first position in response to a minimum feeding pressure and shifting downstream to a second position in response to a maximum feeding pressure, said pressure-responsive device energizing the driving system for high speed advancement of the follower upon shifting of the pressure-responsive device upstream to said first position under minimum feeding pressure and energizing the driving system for low speed advancement of the follower upon shifting of the pressure-responsive device downstream to said second position under maximum pressure, thereby providing a self-regulating feeding pressure at the pick-off station, and transfer means mounted for oscillating motion adjacent said pickoff station, said means engageable successively with the cartons advanced to said pick-off station and transferring the cartons individually to the cartoning machine.

3. An apparatus for transferring cartons to a cartoning machine comprising, an elongated carton magazine arranged to loosely confine a pack of cartons in flat collapsed condition, said carton magazine having a carton pick-off station at a downstream end thereof, a follower engageable with the trailing end of said pack, a frictional conveyor belt extending along the magazine for supporting the pack of cartons therein, a two-speed driving means connected to said follower and to said conveyor for advancing the follower and conveyor continuously toward said pick-off station, said follower imposing positive feeding pressure upon the leading end of the pack at the pick-off station, a shiftable pressure-responsive device residing adjacent said pick-off station in a position to contact the leading end of said pack of cartons, said pressure-responsive device interconnected with said two-speed driving means and controlling the speed thereof in response to the feeding pressure at the leading end of said pack, the driving means advancing the follower and conveyor belt at two different rates which provide substantially uniform feeding pressure at the leading end of said pack in response to said pressure-responsive device, means for disengaging the follower from said driving means adapting the follower to be shifted upstream along said magazine, for replenishing the pack of cartons in the magazine, said pressure-responsive device accelerating the driving means and conveyor upon disengagement of said follower and thereby frictionally maintaining the feeding pressure at said pick-off station during replenishment of said carton pack, and means at said pick-off station for transferring said cartons individually from the pick-off station to the cartoning machine.

4. An apparatus for transferring collapsed cartons to a cartoning machine comprising, a generally horizontal carton magazine arranged to support a pack of cartons in flat collapsed condition and in upright position, a pick-off station at the downstream end of said magazine including restraining means releasably engaging portions of the cartons advanced to the pick-off station, a vibrator section extending endwisely from the downstream end of the magazine to the pick-off station, said vibrator section contacting the side edges of the carton in said pack and imparting vibratory motion thereto, said vibrator section aligning the edges of the said collapsed cartons with one another, a follower engageable with an upstream end of said pack to cartons, a two-speed driving means connected to the follower for advancing the follower means and pack continuously in a downstream direction along said magazine and across said vibrator section to the pick-off station, a shiftable pressure-responsive device mounted to contact the leading end of said pack of cartons at the pick-off station, said pressure-responsive device interconnected with the two-speed driving means and controlling the speed thereof, said driving means thereby advancing the follower at two different rates which provide substantially uniform feeding pressure at the leading end of said pack at said pick-off station in response to the pressure-responsive device, and suction means mounted for oscillation through a generally horizontal path extending endwisely from said pick-off station to said cartoning machine, said suction means establishing a suction engagement successively with the leading face of the cartons advanced to the pick-off station, said suction means withdrawing the cartons individually from the restraining means at said pick-off station and transferring the same directly to the cartoning machine.

5. An apparatus for transferring collapsed cartons in partially erected condition to a cartoning machine having an infeed end comprising, an elongated generally horizontal carton magazine arranged to support a pack of cartons in flat collapsed condition, said magazine having an open side and said collapsed cartons having open ends which are presented at said open side, said magazine having a pick-off station at the downstream end thereof, said pick-off station residing adjacent the infeed end of the cartoning machine, a follower engagiable with the trailing end of the pack of cartons in the magazine, a variable speed driving system connected to said follower for advancing the same continuously in a downstream direction along said magazine toward the pick-off station, means responsive to the pressure imparted by the follower to the leading end of said pack of cartons, said pressure-responsive means interconnected with the variable speed driving system, said pressure-responsive means regulating the rate of continuous advancement of said variable speed driving system, and thereby providing a substantially constant feeding pressure at the leading end of said pack of cartons, a spreader knife residing at said pick-off station, said knife movable along a vertical path of motion at right angles to said horizontal magazine and in registry with the open end of the carton at the pick-off station, said path of motion of the knife intersecting the said open side of the magazine, whereby the knife enters the open end of the carton at the pick-off station, a suction mouthpiece movable in a horizontal plane relative to the face of the carton which is presented at said pick-off station, and driving means connected in common to said spreader knife and suction mouthpiece, said common driving means actuating said knife and suction mouthpiece in time with one another, whereby said knife moves endwisely into the open end of the carton at the pick-off station and said suction mouthpiece engages the face of the carton for withdrawing the same from the pick-off station, said common driving means thereupon retracting the knife from said carton and withdrawing the suction mouthpiece with the carton engaged thereon, whereby the carton is transferred from the pick-off station in partially erected condition directly to the cartoning machine.

6. An apparatus for feeding and transferring collapsed cartons in partially erected condition to a cartoning machine comprising, an elongated generally horizontal carton magazine arranged to support a pack of cartons in flat collapsed condition, said magazine having an open side and said collapsed cartons having open ends which are presented at said open side of the magazine, said magazine having a pick-off station at a downstream end thereof, a follower engageable with the trailing end of the pack of cartons within said magazine, variable speed driving means connected to said follower for advancing the same continuously in a downstream direction along said magazine toward the pick-off station, means at said pick-off station responsive to the pressure imparted to the leading end of said pack of cartons, said variable speed driving system responding to the pressure at said leading end and regulating the continuous advancement of said driving system and follower, thereby providing a substantially constant feeding pressure upon the leading end of said pack of cartons, a knife-mounting arm pivotally mounted at said pick-off station for movement in a plane at right angles to the magazine adjacent the open side of the magazine, a spreader knife mounted upon the swinging end of said arm, a suction cup arm mounted for pivotal motion in a horizontal plane endwisely adjacent the pick-off station, a suction cup mounted upon the swinging end of said arm, common driving means connected to said knife-mounting arm and suction cup arm, said common driving means oscillating said knife and suction cup in time with one another, whereby said knife moves endwisely into the open end of a carton at said pick-off station while said suction cup moves into engagement with the face of said carton, said knife partially erecting said carton and retracting therefrom while said suction cup retracts and withdraws said partially erected carton from the pick-off station for transfer in partially erected condition directly to the cartoning machine.

7. An apparatus for feeding and transferring collapsed cartons in partially erected condition to a cartoning machine, said cartoning machine having a drive shaft for advancing the same, said apparatus comprising, an elongated generally horizontal carton magazine arranged to support a pack of cartons in flat collapsed condition, said magazine having an open top and said collapsed cartons having open ends which are presented at the open top of the magazine, said magazine having a pick-off station at a downstream end thereof, a follower engageable with the trailing end of the pack of cartons within said magazine, variable speed driving means driven from the said drive shaft and connected to said follower for advancing the same lineally in a downstream direction along said magazine toward the pick-off station, means at said pick-off station responsive to the pressure imposed upon the leading end of said pack of cartons, said variable speed driving system responding to the pressure at said leading end and regulating the said driving system and follower, thereby providing a substantially constant feeding pressure upon the leading end of said pack of cartons, a knife-mounting arm pivotally mounted at said pick-off station for movement in a vertical plane adjacent the open top of the magazine, a spreader knife mounted upon the swinging end of said arm, a suction cup arm mounted for pivotal motion in a horizontal plane endwisely adjacent the pick-off station, a suction cup mounted upon the swinging end of the said arm, common driving means connected to said knife-mounting arm and suction cup arm, said common driving means in driving connection with said drive shaft, said drive shaft oscillating said knife and suction cup in time with one another, said variable driving system advancing the cartons to the pick-up station in time with the oscillations of the knife and suction cup, whereby said knife moves endwisely into the open end of a carton at said pick-off station while said suction cup moves into engagement with the face of said carton, said knife partially erecting said carton and retracting therefrom while said suction cup retracts and withdraws said partially erected carton from the pick-off station for transfer in partially erected condition directly to the cartoning machine.

8. An apparatus for tanrsferring collapsed cartons in partially erected condition to a cartoning machine having a power motor, said apparatus comprising, an elongated generally horizontal magazine arranged to loosely confine a pack of cartons in flat collapsed condition and having a discharge end, said magazine having a belt conveyor extending longitudinally thereof, said belt delineating the bottom of the magazine, whereby the lower ends of said cartons are supported in frictional engagement with said belt, said magazine having an open top and said collapsed cartons having open ends which are presented at said open top, pressure-responsive means mounted on the magazine in a position contacting said collapsed cartons, a two-speed transmission in driving connection with said power motor, said two-speed transmission in driving connection with said belt conveyor for advancing the same continuously in a downstream direction along the magazine, said pressure-responsive device electrically interconnected with said two-speed transmission and driving said transmission at low speed in response to a given high pressure frictionally imparted by the belt conveyor to said pack of carton, said pressure-responsive device driving the transmission at a high speed in response to a given low pressure imparted to the pack of cartons, thereby providing a substantially constant feeding pressure, a spreader knife mounted adjacent said horizontal magazine at the discharge end thereof for movement along a vertical path at right angles to the line of advancement of the cartons, a suction mouthpiece mounted adjacent the discharge end of the magazine for movement in a horizontal path extending endwisely from the path of advancement of the cartons, respective actuating means connected to said knife and suction mouthpiece, said respective actuating means in driving connection with said power motor, the actuating means of the spreader knife advancing said knife endwisely along said vertical path through the open top of the magazine into the open end of the carton at the leading end of said advancing pack and partially erecting the same, the actuating means of the mouthpiece advancing the same toward the face of said carton at the leading end of the pack, said mouthpiece providing a suction engagement with said face when said spreader knife enters the open end of the carton, said respective actuating means retracting said spreader knife and retracting the suction cup in time with one another, whereby said suction mouthpiece transfers the carton in partially erected condition directly to said cartoning machine.

9. An apparatus for transferring collapsed cartons to a cartoning machine comprising, an elongated, generally horizontal carton magazine arranged to support a pack of cartons in flat collapsed condition, said cartons having a forward wall and a rearward wall in the direction of advancement, said rearward wall having a flap projecting upwardly therefrom, said carton magazine having a pick-off station at the downstream end thereof, a follower engageable with the trailing end of the pack of cartons in the magaine, a two-speed driving system connected to said follower, said driving system including an electrically-operated clutch adapted to provide one of said speeds upon being energized and the second of said speeds upon being deenergized, said driving system adapted to advance the follower continuously in a downstream direction along said magazine toward said pick-off station, said follower imparting feeding pressure to the pack of cartons, flap restraining means mounted at said pick-off station, said restraining means releasably engaging the flap of the carton as the carton advances to the pick-off station, said carton being forced forwardly under said feeding pressure, a pressure-responsive device engaging the forward wall of the leading carton at the pick-off station, said pressure-responsive device including a switch in electrical connection with said electrically operated clutch for energizing or deenergizing the same, said pressure-responsive device adapted to accelerate the follower through operation of said clutch when said feeding pressure decreases to a predetermined minimum, thereby to maintain a substantially constant feeding pressure at the pick-off station, a suction cup movable endwisely through an arc in a horizontal plane adjacent the pick-off station, actuating means for reciprocating said suction cup through said arc, said actuating means in common driving connection with the driving system of the follower for reciprocating the suction cup in time with the advancement of cartons to the pick-up station, whereby said suction cup advances and engages the face of the cartons at the pick-off station and withdraws the cartons from said flap restraining means for direct transfer to the cartoning machine in time with the advancement of the cartons under said feeding pressure.

10. In an apparatus for transferring cartons to a cartoning machine having a power motor, an elongated carton magazine arranged to support a pack of cartons in flat collapsed condition, a follower engageable with the upstream end of said pack of cartons, a low speed transmission and a high speed transmission, said transmissions connected to said follower for advancing the follower and pack continuously in a downstream direction along the magazine, said transmissions in driving connection with the said power motor, an overrunning clutch interposed in said low speed transmission, said overrunning clutch adapting the follower to advance at a high rate when said high speed transmission is actuated, a normally disengaged electrical clutch interposed in said high speed driving system, a pressure-responsive element mounted in position to contact the leading end of said pack of cartons, a normally open electrical switch connected with said element, said electrical switch interconnected with said electrical clutch for energizing the same upon closing of said switch, said pressure-responsive element shifting in an upstream direction and closing said switch in response to a minimum pressure at the leading end of said pack of cartons and energizing and engaging said electrical clutch, whereby said clutch activates said high speed driving system, said pressure-responsive element shifting in a downstream direction to a second position in response to a maximum feeding pressure, and opening said switch, thereby disengaging said electrical clutch, said low speed driving system thereupon driving through said overrunning clutch and advancing the follower at a low speed rate, said apparatus thereby providing a self-regulating feeding pressure at the leading end of said pack.

References Cited in the file of this patent

UNITED STATES PATENTS

| | | |
|---|---|---|
| 2,291,010 | Vergobbi | July 29, 1942 |
| 2,372,229 | Sinkovitz | Mar. 27, 1945 |
| 2,696,381 | Bateman | Dec. 7, 1954 |
| 2,788,131 | Bergstrom et al. | Apr. 9, 1957 |